United States Patent
Ishihara et al.

(10) Patent No.: US 7,480,087 B2
(45) Date of Patent: Jan. 20, 2009

(54) APPARATUS FOR AND METHOD OF FORMING IMAGES WITH OSCILLATION MIRROR

(75) Inventors: Yasumasa Ishihara, Matsumoto (JP); Yujiro Nomura, Shiojiri (JP); Akihiro Gomi, Fujimi-machi (JP); Ken Ikuma, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 340 days.

(21) Appl. No.: 11/464,010

(22) Filed: Aug. 11, 2006

(65) Prior Publication Data

US 2007/0070483 A1 Mar. 29, 2007

(30) Foreign Application Priority Data

Sep. 26, 2005 (JP) ............................. 2005-278428

(51) Int. Cl.
*G02B 26/08* (2006.01)
*B41J 2/435* (2006.01)

(52) U.S. Cl. ...................... 359/213; 359/199; 359/224; 347/248; 347/260

(58) Field of Classification Search ........................ None
See application file for complete search history.

(56) References Cited

U.S. PATENT DOCUMENTS 7,079,297 B2 * 7/2006 Sakai .......................... 359/196

7,391,003 B2 * 6/2008 Nomura et al. ............ 250/208.1

FOREIGN PATENT DOCUMENTS

| JP | 01-302317 | 12/1989 |
| JP | 09-197334 | 7/1997 |
| JP | 2004-053943 A | 2/2004 |
| JP | 2004-069731 | 3/2004 |

* cited by examiner

*Primary Examiner*—James Phan
(74) *Attorney, Agent, or Firm*—Hogan & Hartson LLP (57) ABSTRACT

An image forming method which generates a video signal corresponding to an image forming command based on a video clock signal, modulates a light beam according to the video signal, and scans the modulated light beam along a main scanning direction by means of an oscillation mirror which resonates based on a drive signal, so as to form a latent image in an effective image region of a latent image carrier, the method includes: synchronizing the drive signal with the video clock signal to synchronize a detection signal with the vide clock signal, the detection signal being output from a detector which detect the light beam scanned in the main scanning direction in a region away from an effective scan region which corresponds to the effective image region; controlling a resonant frequency of the oscillation mirror based on the detection signal so that the resonant frequency of the oscillation mirror almost coincides with the frequency of the drive signal; and adjusting a position, at which the latent image is written over the latent image carrier, is adjusted by adjusting output timing of the video signal based on the detection signal from the detector.

6 Claims, 4 Drawing Sheets

APPARATUS FOR AND METHOD OF FORMING IMAGES WITH OSCILLATION MIRROR

CROSS REFERENCE TO RELATED APPLICATION

The disclosure of Japanese Patent Application No. 2005-278428 filed Sep. 26, 2005 including specification, drawings and claims is incorporated herein by reference in its entirety.

BACKGROUND

1. Technical Field

The present invention relates to an image forming method and an image forming apparatus in which video signals corresponding to an image forming command are generated and then an image is formed. To be more specific, the apparatus forms a latent image over a latent image carrier, by means of an oscillation mirror scanning a modulated light beam that is obtained by modulating a light beam in accordance with the video signal along a main scanning direction.

2. Related Art

In an electrophotographic image forming apparatus, such as printers, copiers, facsimiles, and like, an image forming command is applied to a controller from an external apparatus such as a host computer, etc, in accordance with an image forming request from a user. Then, the controller converts the image forming command to a data format tailored for an operation command for an engine section. Further, while the engine section is controlled based on the data, an image corresponding to the image forming command is formed on a sheet (recording material), such as copy sheet, transfer sheet, paper and transparent OHP sheet, etc. This means that a video signal corresponding to the image forming command is generated based on a video clock signal and is output to an exposure unit in the engine section. Based on the video signal, a light source of an exposure unit is on/off controlled to emit a light beam, which is modulated in accordance with the video signal. The modulated light beam is scanned along a main scanning direction by a deflector of the exposure unit, thereby forming line latent images corresponding to the video signal over the latent image carrier of a photosensitive member and like. Then, these line latent images are developed with toner, whereby toner images are formed.

Use of a resonant oscillation mirror as a deflector is commonly proposed because of an increase in demand for a downsizing and a speed-enhancement of the deflectors (refer to JP-A-1-302317). In this apparatus, a frequency of drive signal (hereafter referred to as "drive frequency") that is applied to the oscillation mirror is matched with a resonant oscillation frequency (resonant frequency) which is unique to an individual oscillation mirror. This makes the oscillation mirror resonate, and consequently relative large amplitude is obtained. Further, the light beam is emitted from the light source to the resonating oscillation mirror for the scanning of the light beam.

However, the resonant frequency of the oscillation mirror may fluctuate depending on the processing method of the oscillation mirror, the temperature around the oscillation mirror and the like. Such fluctuations will change the scanning speed of the light beam over the latent image carrier, thereby causing the latent image formed over the latent image carrier to shrink or expand along the main scanning direction, consequently reducing the image quality. To tackle this issue, the technology to control resonant frequency of an oscillation mirror to coincide with drive frequency has been proposed (refer to JP-A-2004-69731). Specifically, according to the invention described in this document, a thin film heater is mounted on the oscillation mirror as a heater element. Then, while detecting the swing angle of the oscillation mirror, the amount of electric current to the thin film heater is controlled to maximize the swing angle, thereby making the resonant frequency coincide with the drive frequency (Resonant Frequency Control). The swing angle of the oscillation mirror is detected in manner that a detection section such as a light detection element detects the light beam that scanned by the oscillation mirror.

SUMMARY

In the conventional apparatus, drive control of the oscillation mirror is executed in an engine section which is disposed with an exposure unit, i.e. a closed system. This means that the control of the oscillation mirror is not synchronized with the controller, and a resonant frequency control is executed asynchronous with the controller. Therefore, even after the completion of the resonant frequency control for driving the oscillation mirror with sufficient amplitude, the oscillation mirror operates in asynchronous with the controller. This causes such a problem as deviation of the write position of the latent image by a maximum of one pixel per line latent image, as described hereinafter.

An advantage of some aspects of the invention is to prevent deviation of write position of a latent image while oscillating an oscillation mirror with the amplitude sufficient for forming the latent image in an apparatus and a method of forming an image.

According to an aspect of the invention, an image forming method generates a video signal corresponding to an image forming command based on a video clock signal, modulates a light beam according to the video signal, and scans the modulated light beam along a main scanning direction by means of an oscillation mirror which resonates based on a drive signal, so as to form a latent image in an effective image region of a latent image carrier. The method comprises: synchronizing the drive signal with the video clock signal to synchronize a detection signal with the vide clock signal, the detection signal being output from a detector which detect the light beam scanned in the main scanning direction in a region away from an effective scan region which corresponds to the effective image region; controlling a resonant frequency of the oscillation mirror based on the detection signal so that the resonant frequency of the oscillation mirror almost coincides with the frequency of the drive signal; and adjusting a position, at which the latent image is written over the latent image carrier, is adjusted by adjusting output timing of the video signal based on the detection signal from the detector.

According to another aspect of the invention, an image forming apparatus generates a video signal corresponding to an image forming command based on a video clock signal, modulates a light beam according to the video signal, and scans the modulated light beam along a main scanning direction by means of an oscillation mirror which resonates based on a drive signal, so as to form a latent image in an effective image region of a latent image carrier. The apparatus comprises: a mirror driver which drive the oscillation mirror; a mirror drive controlling section which controls oscillation operation of the oscillation mirror by applying a drive signal, which is synchronized with the video clock signal, to the mirror driver; a detector which detects the light beam, which is scanned along the main scanning direction by means of the oscillation mirror in the region away from an effective scan region which corresponds to the effective image region, and outputs a detection signal; a write timing adjuster which adjusts a position at which the latent image is written over the latent image carrier by controlling an output timing of the video signal based on the detection signal which is output from the detector; a resonant frequency adjuster which adjust a resonant frequency of the oscillation mirror; and a frequency controlling section which controls the resonant frequency adjuster based on the detection signal which is output from the detector, thereby making the resonant frequency of the oscillation mirror almost coincide with a frequency of the drive signal, while driving the oscillation mirror with the drive signal.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DESCRIPTION OF EXEMPLARY EMBODIMENTS

Figure 1:
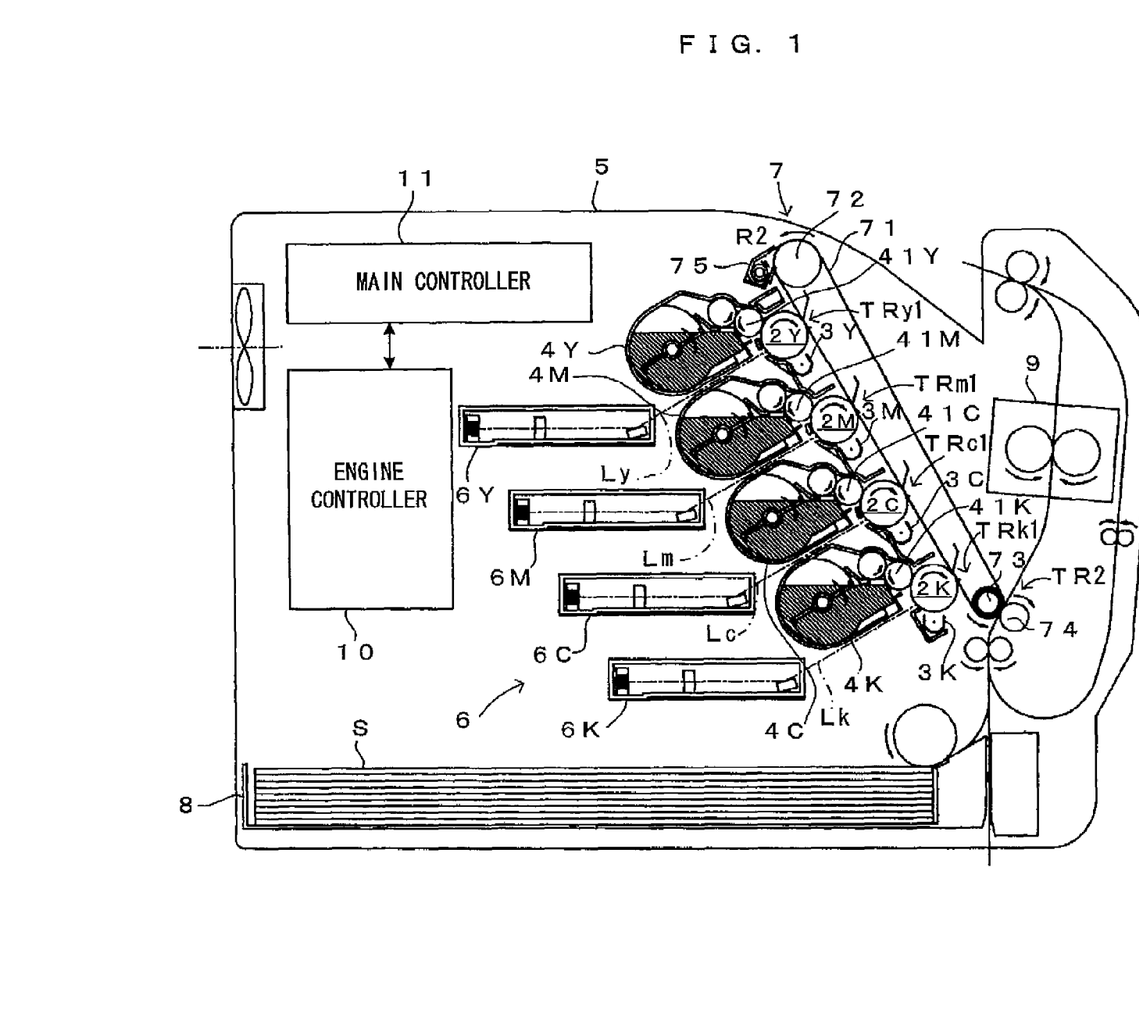
FIG. 1 is a drawing of one embodiment of an image forming apparatus according to the invention.
Figure 2:
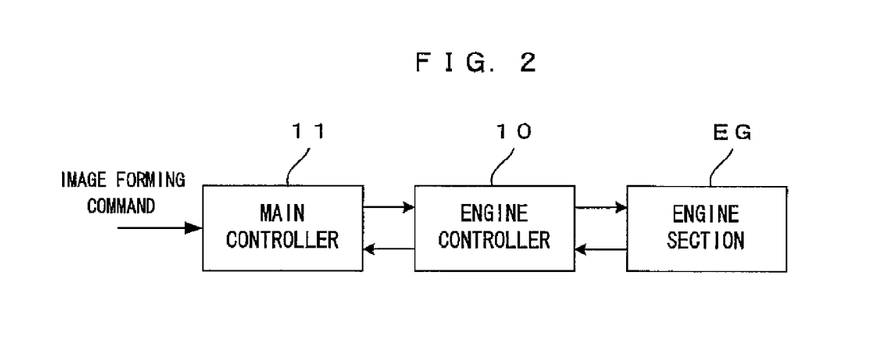
FIG. 2 is a block diagram showing an electric structure of the image forming apparatus shown in FIG. 1.

FIG. 1 is a diagram showing an image forming apparatus according to an embodiment of the invention. FIG. 2 is a block diagram showing an electrical arrangement of the image forming apparatus of FIG. 1. This image forming apparatus is a so-called tandem color printer wherein photosensitive members 2Y, 2M, 2C, 2K for four colors of yellow (Y), magenta (M), cyan (C) and black (K), as latent image carriers, are juxtaposed in an apparatus body 5. The apparatus is adapted to form a full-color image by superimposing toner images on the individual photosensitive members 2Y, 2M, 2C, 2K, or to form a monochromatic image using only the toner image of black (K). The image forming apparatus operates as follows. The apparatus comprises a main controller 11 which has a CPU and a memory. When an external apparatus such as a host computer applies an image forming command to the main controller 11 in response to a request from a user wanting to form an image, the main controller 11 sends image signals, a reference signal, control signals and the like to an engine controller 10. In response to the signals from the main controller 11, individual parts of an engine section EG operate to form the image corresponding to the image forming command on a sheet S such as copy sheet, transfer sheet, paper and transparent sheet for OHP.

In the engine section EG, charger units, developing units, exposure units and cleaners are provided in correspondence to respective ones of the four photosensitive members 2Y, 2M, 2C, and 2K. Thus, the photosensitive member, the charger unit, the developing unit, the exposure unit and the cleaner are provided on a per-toner-color basis, thereby constituting an image forming unit for forming a toner image of each corresponding toner color. It is noted here that these image forming units (the photosensitive members, charger units, developing units, exposure units and cleaners) for the respective color components are arranged the same way. Therefore, the arrangement for the yellow color component is described here while individual parts of the arrangements for the other color components are represented by equivalent reference characters, respectively, and the description thereof is dispensed with.

The photosensitive member 2Y is arranged to be rotatable in a direction of an arrow in FIG. 1 (sub-scan direction). A charger unit 3Y, a developing unit 4Y and a cleaner (not shown) are arranged around the photosensitive member 2Y along the rotational direction. The charger unit 3Y comprises a scorotron charger, for example, which is applied with a charging bias thereby uniformly charging an outside surface of the photosensitive member 2Y to a predetermined surface potential. An exposure unit 6Y emits a scanning light beam Ly toward the outside surface of the photosensitive member 2Y so charged by the charger unit 3Y. Thus, an electrostatic latent image corresponding to yellow image data included in the image forming command is formed on the photosensitive member 2Y. Arrangements and operations of the exposure unit 6 (6Y, 6M, 6C, 6K) will be described in details hereinlater.

The electrostatic latent image thus formed is developed with toner by means of the developing unit 4Y. The developing unit 4Y contains therein a yellow toner. When the engine controller 11 applies a developing bias to a developing roller 41Y, the toner carried on the developing roller 41Y is made to locally adhere to surface portions of the photosensitive member 2Y according to the surface potentials thereof. As a result, the electrostatic latent image on the photosensitive member 2Y is visualized, whereby a yellow toner image is formed thereon.

The yellow toner image developed by the developing unit 4Y is primarily transferred onto an intermediate transfer belt 71 of a transfer unit 7 in a primary transfer region TRy1. The other members for the other color components than yellow are arranged absolutely the same way as those for yellow. A magenta toner image, a cyan toner image and a black toner image are formed on the respective photosensitive members 2M, 2C, 2K and are primarily transferred onto the intermediate transfer belt 71 in respective primary transfer regions TRm1, TRc1, TRk1.

The transfer unit 7 includes: an intermediate transfer belt 71 stretched across two rollers 72, 73; and a belt driver (not shown) operative to drive the roller 72 into rotation thereby rotating the intermediate transfer belt 71 in a predetermined rotational direction R2. The transfer unit 7 is further provided with a secondary transfer roller 74. The roller 74 confronts the roller 73 with the intermediate transfer belt 71 interposed therebetween and is adapted to be moved into contact with or away from a surface of the belt 71 by means of an unillustrated electromagnetic clutch. In a case where a color image is transferred to the sheet S, primary transfer timings are controlled to superimpose the individual toner images on each other thereby to form the color image on the intermediate transfer belt 71. Then, the color image is secondarily transferred onto the sheet S taken out from a cassette 8 and delivered to a secondary transfer region TR2 between the intermediate transfer belt 71 and the secondary transfer roller 74. In a case where a monochromatic image is transferred onto the sheet S, on the other hand, only a black toner image is formed on the photosensitive member 2K and the monochromatic image is secondarily transferred onto the sheet S delivered to the secondary transfer region TR2. The sheet S thus secondarily transferred with the image is transported to a discharge tray at a top surface of the apparatus body via a fixing unit 9.

After the primary transfer of the toner images to the intermediate transfer belt 71, the photosensitive members 2Y, 2M, 2C, 2K have their the surface potentials reset by unillustrated static eliminators. In addition, the photosensitive members 2Y, 2M, 2C, 2K are removed of the toners remaining on their surfaces by means of the cleaners. Then, the photosensitive members are subjected to the subsequent charging by means of the charger units 3Y, 3M, 3C, and 3K.

Disposed in the vicinity of the roller 72 are a transfer belt cleaner 75 and a density sensor. The cleaner 75 is adapted to be moved into contact with or away from the roller 72 by means of an unillustrated electromagnetic clutch. As moved to the roller 72, the cleaner 75 holds its blade against the surface of the intermediate transfer belt 71 stretched across the roller 72 thereby removing the toner remaining on the outside surface of the intermediate transfer belt 71 after the secondary image transfer.

Figure 3:
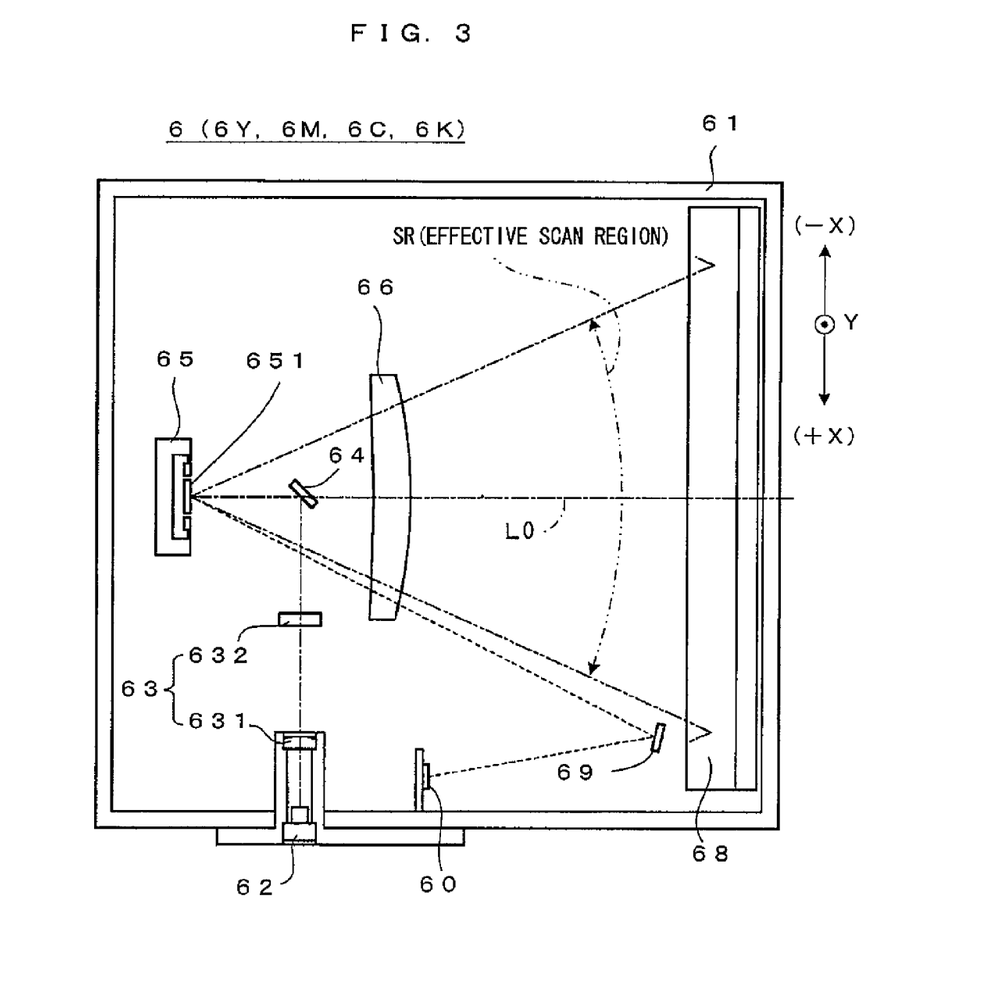
FIG. 3 is a main-scanning cross sectional view showing the structure of an exposure unit of the image forming apparatus which is shown in FIG. 1.
Figure 4:
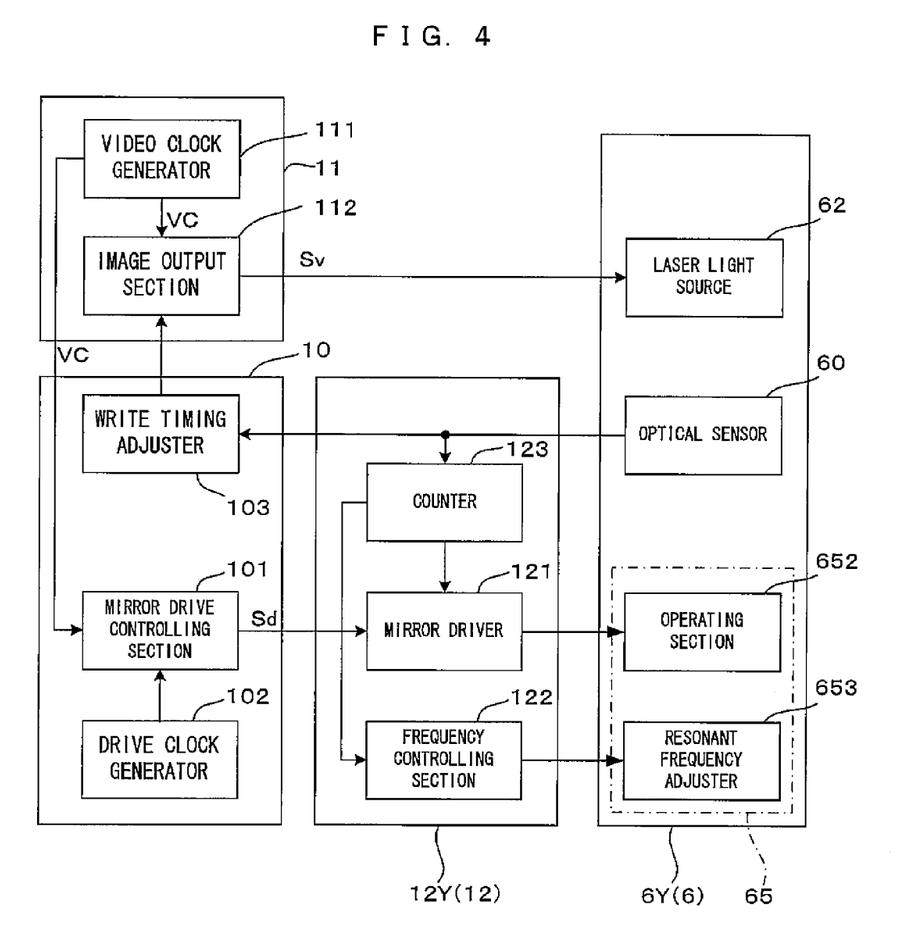
FIG. 4 is a diagram showing the exposure unit and an exposure control unit of the image forming apparatus which is shown in FIG. 1.

FIG. 3 is a main-scanning cross sectional view showing the structure of the exposure unit disposed to the image forming apparatus described in FIG. 1. FIG. 4 is a diagram showing the exposure unit of the image forming apparatus described in FIG. 1 and an exposure control unit for controlling the exposure unit. Hereinafter the structure and operation of the exposure unit 6 and the exposure control unit 12 will be described in detail. Since the exposure unit 6 and the exposure control unit 12 are arranged in identical manner across all the color components, only the structure for the yellow color will be described here, while individual parts for the other color components are represented by equivalent reference characters, respectively and the description thereof is dispensed with.

As shown in FIG. 3, the exposure unit 6Y comprises an exposure casing 61. Further, a single laser light source 62 is fastened to the exposure casing 61 to enable the laser light source 62 to emit a light beam. This laser light source 62 is on/off controlled based on a video signal from a main controller 11, and the light beam that is modulated corresponding to the video signal is ejected forward from the laser light source 62. In this embodiment, a video clock generator 111 is disposed to the main controller 11 to output a video clock signal VC which has a standard frequency, for example, 68 MHz. Further, based on this video clock signal VC, an image output section 112 forms a video signal Sv corresponding to an yellow image data that is included in the image forming commands applied to the main controller 11. This video signal Sv is output to the laser light source 62 of the exposure unit 6Y, whereby the light beam is modulated according to the video signal Sv and thus modulated light beam is emitted forward from the laser light source 62. Furthermore, this embodiment adopts so called intensive modulation system, wherein a pulse width corresponding to one pixel is fixed, hence a pulse width corresponding to one pixel of a latent image is set to a predetermined value.

To make the light beam from the laser source 62 scan and expose the surface (not shown) of the photosensitive member 2, a collimator lens 631, a cylindrical lens 632, a deflector 65, a scanning lens 66 and a mirror 68 are disposed inside the exposure housing 61. In other words, after shaped into collimated light of a proper size by the collimator lens 631, the light beam from the laser source 62 impinges upon the cylindrical lens 632 which has power only in the sub scanning direction Y. As the cylindrical lens 632 is adjusted, the collimated light is imaged in the vicinity of a deflection mirror surface 651 of the deflector 65 in the sub scanning direction Y. In this embodiment, the collimator lens 631 and the cylindrical lens 632 thus function as a beam shaping system 63 which shapes the light beam from the laser source 62.

Further, the mirror 64 is located between the beam shaping system 63 and the deflection mirror surface 651 of the deflector 65 so as to make the light beam guide to the deflection mirror surface 651 at an angle. That is, after shaped by the beam shaping system 63, the light beam from the laser source 62 may be returned by the mirror 64 and incident upon the deflection mirror surface 651 at an acute angle with respect to a reference plane. The reference plane is parallel to a drawing surface of FIG. 3 and is orthogonal to the pivot axis (an axis perpendicular to the drawing surface of FIG. 3) of the deflection mirror surface 651 of the deflector 65.

The deflector 65 is made using a micro machining technique which is an application of semiconductor manufacturing techniques and which aims at forming an integrated micro machine on a semiconductor substrate. Therefore, the deflector 65 is capable of deflecting a light beam reflected by the resonating deflection mirror surface 651 in a main scanning direction X. To be more specific, the deflection mirror surface 651 is axially supported so that the deflection mirror surface 651 can freely pivot about a pivot axis which is approximately orthogonal to the main scanning direction X. The deflection mirror surface 651 pivots about the pivot axis in accordance with external force applied from an operating section 652. Based on a mirror drive signal from a mirror driver 121 of the exposure control unit 12Y, the operating section 652 exerts electrostatic, electromagnetic or mechanical external force upon the deflection mirror surface 651 and makes the deflection mirror surface 651 pivot at the frequency of the mirror drive signal. The drive provided by the operating section 652 may be one which utilizes electrostatic absorption, electromagnetic force or mechanical force, each driving method of which is already known and will not be described here.

Figure 5:
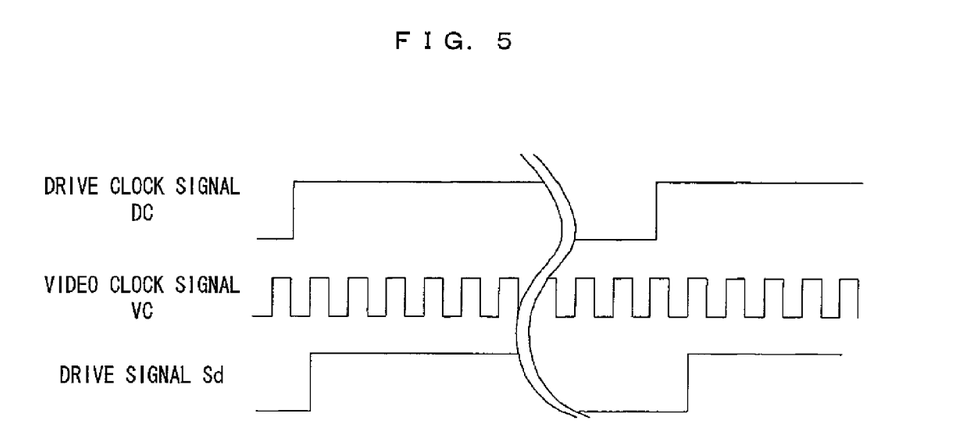
FIG. 5 is a diagram showing a relationship among a drive lock, a video clock signal and a drive signal.

In this embodiment, in order to control ON/OFF of the oscillation operation of the deflector 65, an engine controller 10 includes a mirror drive controlling section 101. That is, the CPU of the engine controller 10 functions as the mirror drive controlling section 101. While the video clock signal VC is sent to this mirror drive controlling section 101 from the video clock generator 111, a drive clock DC having a drive frequency (for example 5 Hz) and coinciding with the operation frequency of the deflector 65 is sent from a drive clock generator 102 as well. Further in order to make the deflecting mirror surface 651 resonate, the mirror drive controlling section 101 generates a drive signal Sd, by synchronizing a drive clock DC with the video clock signal VC, and send it to the mirror drive section 121 as shown by FIG. 5. This ensures the oscillation operation of the deflector 65 to be synchronized with a video clock signal VC.

In the third embodiment, the deflector 65Y is provided with a resonant-frequency adjusting section 653 as disclosed in Japanese Unexamined Patent Publication JP-A-2004-69731 and JP-A-9-197334, for example. Thus, the embodiment is adapted to vary the resonant frequency of the deflector 65. Specifically, this resonant-frequency adjusting section 653 includes an electrical resistance element formed at the torsion spring (not shown) of the deflector 65. The electrical resistance element is electrically connected with a frequency controlling section 122 of the exposure control unit 12Y. The frequency controlling section 122 controls power supply to the electrical resistance element so as to vary the temperature of the torsion spring. Thus is varied the spring constant of the torsion spring so that the resonant frequency of the deflector 65 can be varied. In a case where the resonant frequency does not coincide with the frequency (drive frequency) of the mirror drive signal, as will be described hereinlater, the embodiment operates the resonant-frequency adjusting section 653 to vary the resonant frequency of the deflector 65 for substantially matching the resonant frequency with the drive frequency. It is noted that a specific arrangement for varying the resonant frequency of the deflector 65 is not limited to this, and any conventionally known arrangement may be adopted.

Furthermore, the mirror driver 121 is arranged to be capable of changing and setting the driving conditions of mirror drive signal such as voltage, current and the like. Therefore, a voltage of mirror drive signal can be changed when necessary, thereby making it also possible to adjust the amplitude value of the deflector 65, through voltage change.

The light beam, which is reflected by the deflecting mirror surface 651 of the deflector 65, is deflected toward a scanning lens 66. Then, the light beam deflected toward the scanning lens 66 is focussed via the scanning lens 66 and the mirror 68 onto an effective image region on the surface of the photosensitive member 2. As a result, the light beam scans along the main scanning direction X to form a line latent image extending along the main scanning direction X on the effective image region of the photosensitive member 2. It is noted that the maximum scan region, which is scannable by deflector 65, is set wider than a scan region ("effective scan region" according to this invention) SR, which is set to ensure the light beam to scan over the effective image region. Furthermore, the effective scan region SR is positioned at approximate center of the maximum scan region and is approximately symmetrical with optical axis LO.

Furthermore, in this embodiment, as shown in FIG. 3, a reflective mirror 69 guides the scanning light beam toward an optical sensor 60 at one side of the scanning paths. This reflective mirror 69 is disposed at the end of the maximum scan region and guides the scanning light beam which moves within the maximum scan region and outside the effective scan region SR toward the optical sensor 60. At a time when the scanning light beam is received by the optical sensor 60 and passes by a sensor position, a detection signal Hsync is output from the optical sensor 60. As foregoing has described, in this embodiment, the optical sensor 60 makes it possible to detect the light beam scanning along the main scanning direction X outside the effective scan region SR, therefore, this optical sensor 60 corresponds to a "detector" of this invention.

Figure 6:
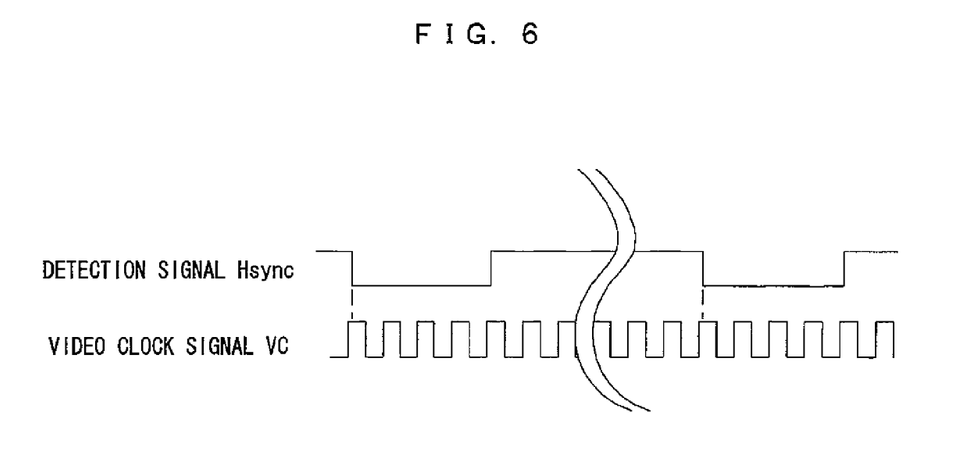
FIG. 6 is a diagram showing a relationship between a detection signal and the video clock signal.

Looking hereby at the relationship between the detection signal Hsync and the video clock signal VC reveals the following characteristics according to this embodiment. Specifically, as aforementioned, the deflector 65 is driven based on the drive signal Sd which is obtained through synchronization of the drive clock DC and the video clock signal VC, so as to oscillate in synchronization with the video clock signal VC. Therefore, the detection signal Hsync is also synchronized with the video clock signal VC as shown in FIG. 6. Further, according to this embodiment, the detection signal Hsync is applied to the write timing adjuster 103 of the engine controller 10. After a predetermined period of time have elapsed from the time of receiving the detection signal Hsync, the write timing adjuster 103 outputs the video request signal to the image output section 112. Upon receiving the signal, the image output section 112 outputs the video signal Sv based on the video clock signal VC. Hence, with the write timing adjuster 103 adjusting the output timing of the video request signal, the position at which the latent image is written into the photosensitive member 2 is adjusted (write timing adjustment process).

Further, the detection signal Hsync of the scanning light beam obtained by the optical sensor 60 is also transmitted to a counter 123 of the exposure control unit 12Y. The counter 123 obtains drive information related to the scanning time and drive cycle of the light beam scanning in the effective scan region SR. Then, the information that is calculated at the counter 123 is transmitted to the frequency controlling section 122, hereafter the frequency controlling section 122 adjusts the resonant frequency of the deflector 65.

Furthermore, in the apparatus with the aforementioned arrangement, when the image forming command is applied at the time when the deflector 65 is not oscillating, an initiation process is executed before starting the image formation. The initiation process is for adjustment of the deflector 65 so as to synchronize the oscillation of the deflector 65 with the video clock signal Vc and accordingly ensure the optimum scanning of the light beam by the deflector 65. More specifically, the initiation process includes synchronization and resonant frequency controlling processes. Hereafter will describe the case that color image forming command is applied as an image forming command, while the following operation is executed only for the black color in the case that monochromatic image command is applied.

When the color image forming command is applied, the initiation process for the deflector 65 is executed on yellow color. Firstly, as indicated in FIG. 5, the synchronization between the drive clock DC and the video clock signal VC is achieved at the mirror drive controlling section 101 to generate the drive signal Sd which is in sync with drive clock DC. The drive signal Sd is output to the mirror driver 121 to drive the deflector 65. Therefore, the deflector 65 oscillates while synchronizing with the video clock signal VC. When the optical sensor 60 detects the light beam which is scanned by the deflector 65 driven in the aforementioned manner, it outputs the detection signal Hsync. Consequently, the detection signal Hsync synchronizes with the video clock signal VC as indicated in FIG. 6 (Synchronization process).

While the synchronization process is executed as aforementioned, in the event that the resonant oscillation frequency of the deflector 65 deviates from the frequency of the drive signal Sd, i.e. drive frequency, the maximum amplitude value of the deflection mirror surface 651 becomes far below the maximum amplitude during its resonant oscillation. Therefore, a resonant frequency controlling process is executed for the deflector 65, after a predetermined time period.

In this resonant frequency controlling process, the video signal Sv is output to the laser light source 62 to turn on the laser light source 62. The resonant frequency controlling process herein may be also executed by applying the video signal, which is appropriate for the resonant frequency controlling process from the image output section to the laser light source 62, as described below. Since the deflector 65 is already oscillating resonantly at the time when the laser light source 62 turns on, the light beam scans on the surface of photosensitive member 2Y to prevent the light beam from radiating intensively to a local portion of the photosensitive member 2Y. Further, simultaneously with the scanning of the light beam, the detection signal Hsync is output from the optical sensor 60. Further, with the frequency controlling section 122 controlling the amount of current applied to the electric resistance element based on the sensor output, the temperature of the torsion spring of the deflector 65 is changed to shift the resonating characteristics of the deflector 65 closer to drive frequency. Consequently, the amplitude value of the resonant frequency of the deflector 65 will almost coincide with the drive frequency to show the maximum amplitude.

Completion of the resonant frequency controlling process hereby completes the initiation process. Thereafter, based on the detection signal Hsync from the optical sensor 60, the video signal Sv corresponding to the image forming command is output from the image output section 112 according to the video request signal from the write timing adjuster 103, to begin the writing of a latent image on the photosensitive member 2.

As described above, according to this embodiment, since the drive signal Sd is synchronized with the video clock signal VC, the oscillation operation of the deflector 65 is also synchronized with the video clock signal VC. Accordingly, the detection signal Hsync is output from the optical sensor 60 while being synchronized with the video clock signal VC. Further, executing resonant frequency controlling process based on the detection signal Hsync enables the resonant frequency of the deflector 65 to almost coincide with the drive frequency, thereby making the deflector 65 drive at the amplitude sufficient for image forming. Furthermore, after such execution of the resonant frequency control, the video request signal is applied to the image output section 112 from the write timing adjuster 103 based on the detection signal Hsync to adjust the position where the latent image is written on the photosensitive member 2. This delivers the following benefits as well.

Figure 7:
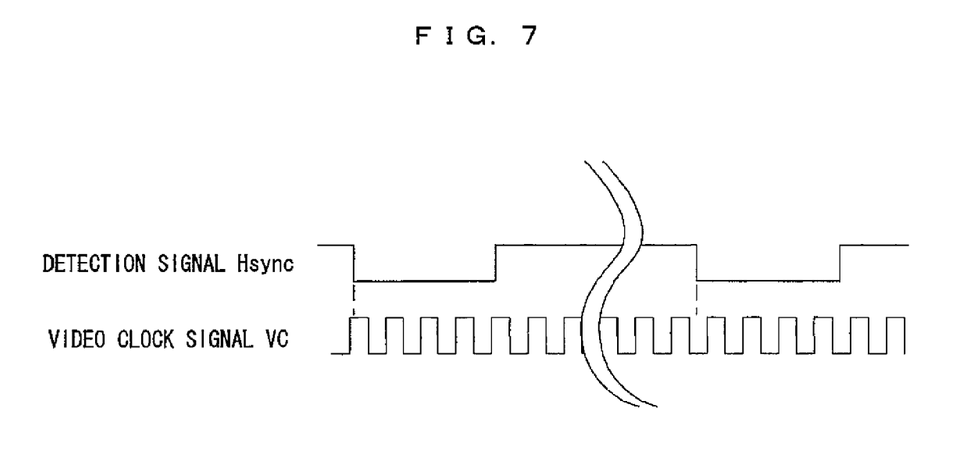
FIG. 7 is a diagram showing a relationship between the detection signal and the video clock signal in a conventional apparatus.

In the conventional apparatus, the operation of the deflector 65 is asynchronous with the video clock signal VC which is a reference signal of the video signal Sv. Hence, the detection signal Hsync from the optical sensor 60 also becomes asynchronous with the video clock signal VC, whereby the relationship between the detection signal Hsync and the video clock signal VC changes by every single latent image line, as shown in FIG. 7. In turn, the deviation between the line latent images becomes as big as one pixel maximum. Even if the output timing of the video signal Sv is adjusted based on the detection signal Hsync, the position at which the latent image is written on the photosensitive member 2 fluctuate along main scanning direction X at every single line of the latent image to cause deviation between the line latent images amounting to one pixel maximum. This could become one of the main factors for reduced image quality.

Whereas in this embodiment on the other hand, since the detection signal Hsync and the video clock signal VC are synchronized with each other as indicated in FIG. 6, the relationship between the detection signal Hsync and the video clock signal VC does not fluctuate at any timing of line latent image forming. This effectively prevents the writing start of the latent image from deviating along the main scanning direction X. As a result, a high quality image will be formed.

Further, in this embodiment, since the detection signal Hsync and the video clock signal VC are synchronized already at the time when the resonant frequency controlling process is completed, the image forming can be started based on the detection signal Hsync that is output from the optical sensor 60 immediately after the resonant frequency controlling process. Further, since the image forming is started immediately after the resonant frequency controlling process, the processing time is shortened to accelerate the speed of the apparatus.

It is to be noted that the invention is not limited to the foregoing embodiments and various modifications other than the above may be made thereto so long as such modifications do not depart from the scope of the invention. While the embodiment employs the resonant-frequency adjusting section 653 which utilizes the variations of the spring constant associated with temperature variations, the arrangement of the resonant-frequency adjusting section 653 is not limited to this. The resonant frequency may be adjusted by the conventionally known methods.

In addition, the embodiment applies the invention to the color image forming apparatuses of the tandem system, but the scope of the invention is not limited to this. The invention is also applicable to monochromatic image forming apparatuses for forming monochromatic images.

In the foregoing embodiments, the deflector 65 formed using the micromachining technique is employed as the oscillation mirror. The invention is applicable to all kinds of image forming apparatuses which use the oscillation mirror adapted for resonant oscillations for deflecting the light beam thereby scanning the light beam on the latent image carrier.

Although the invention has been described with reference to specific embodiments, this description is not meant to be construed in a limiting sense. Various modifications of the disclosed embodiment, as well as other embodiments of the invention, will become apparent to persons skilled in the art upon reference to the description of the invention. It is therefore contemplated that the appended claims will cover any such modifications or embodiments as fall within the true scope of the invention.

What is claimed is:

1. An image forming method which generates a video signal corresponding to an image forming command based on a video clock signal, modulates a light beam according to the video signal, and scans the modulated light beam along a main scanning direction by means of an oscillation mirror which resonates based on a drive signal, so as to form a latent image in an effective image region of a latent image carrier, the method comprising:
   synchronizing the drive signal with the video clock signal to synchronize a detection signal with the vide clock signal, the detection signal being output from a detector which detects the light beam scanned in the main scanning direction in a region away from an effective scan region which corresponds to the effective image region;
   controlling a resonant frequency of the oscillation mirror based on the detection signal so that the resonant frequency of the oscillation mirror almost coincides with the frequency of the drive signal; and
   adjusting a position, at which the latent image is written over the latent image carrier, by adjusting output timing of the video signal based on the detection signal from the detector.

2. The image forming method of the claim 1, wherein a pulse width of the video signal is fixed to correspond to one pixel of the latent image.

3. The image forming method of the claim 1, wherein the latent image forming starts immediately after the completion of controlling the resonant frequency based on the detection signal which is output from the detector.

4. The image forming method of the claim 1, wherein the oscillation mirror is axially supported freely to pivot about a torsion spring, and the resonant frequency is adjusted by controlling a temperature of the torsion spring.

5. The image forming method of the claim 4, wherein the amount of current applied to an electric resistance element which is formed on the torsion spring is controlled, so as to change the temperature of the torsion spring.

6. An image forming apparatus which generates a video signal corresponding to an image forming command based on a video clock signal, modulates a light beam according to the video signal, and scans the modulated light beam along a main scanning direction by means of an oscillation mirror which resonates based on a drive signal, so as to form a latent image in an effective image region of a latent image carrier, the apparatus comprising:

- a mirror driver which drives the oscillation mirror;
- a mirror drive controlling section which controls oscillation operation of the oscillation mirror by applying a drive signal, which is synchronized with the video clock signal, to the mirror driver;
- a detector which detects the light beam, which is scanned along the main scanning direction by means of the oscillation mirror in the region away from an effective scan region which corresponds to the effective image region, and outputs a detection signal;
- a write timing adjuster which adjusts a position at which the latent image is written over the latent image carrier by controlling an output timing of the video signal based on the detection signal which is output from the detector;
- a resonant frequency adjuster which adjust a resonant frequency of the oscillation mirror; and
- a frequency controlling section which controls the resonant frequency adjuster based on the detection signal which is output from the detector, thereby making the resonant frequency of the oscillation mirror almost coincide with a frequency of the drive signal, while driving the oscillation mirror with the drive signal.

* * * * *